US012142751B2

United States Patent
Bobel et al.

(10) Patent No.: US 12,142,751 B2
(45) Date of Patent: Nov. 12, 2024

(54) PRE-LITHIATION OF BATTERY ELECTRODE MATERIAL

(71) Applicant: GM GLOBAL TECHNOLOGY OPERATIONS LLC, Detroit, MI (US)

(72) Inventors: Andrew C. Bobel, Troy, MI (US); Anil K. Sachdev, Rochester Hills, MI (US); Jeffrey D. Cain, Royal Oak, MI (US); Leng Mao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1176 days.

(21) Appl. No.: 16/912,150

(22) Filed: Jun. 25, 2020

(65) Prior Publication Data
US 2021/0408517 A1   Dec. 30, 2021

(51) Int. Cl.
*H01M 4/04* (2006.01)
*H01M 4/38* (2006.01)
*H01M 4/46* (2006.01)
*H01M 10/0525* (2010.01)

(52) U.S. Cl.
CPC ....... *H01M 4/0461* (2013.01); *H01M 4/0445* (2013.01); *H01M 4/382* (2013.01); *H01M 4/466* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 5,350,647 | A * | 9/1994 | Hope | H01M 4/40 429/231.6 |
| 2019/0089016 | A1* | 3/2019 | Paz | H01M 10/446 |
| 2021/0066703 | A1* | 3/2021 | Kim | H01M 4/0416 |
| 2022/0006065 | A1* | 1/2022 | Chae | H01M 4/1395 |

FOREIGN PATENT DOCUMENTS

CN   108539124 A   9/2018

OTHER PUBLICATIONS

Zhang, Y., et al. "The nature of electrochemical delithiation of Li-mg alloy electrodes: Neutron computed tomography and analytical modeling of Li Diffusion and delithiation phenomenon." Journal of The Electrochemical Society, vol. 164, No. 2, Dec. 5, 2016, pp. A28-A38. (Year: 2016).*

\* cited by examiner

*Primary Examiner* — Robert S Carrico
(74) *Attorney, Agent, or Firm* — Lorenz & Kopf, LLP (57) ABSTRACT

A method for making a pre-lithiated electrode for a lithium ion battery cell, a method for making a battery with a pre-lithiated electrode, and an electric vehicle with a pre-lithiated electrode are provided. An exemplary method for making a pre-lithiated electrode for a lithium ion battery cell includes electrochemically connecting a magnesium-lithium alloy to the electrode. Further, the method includes pre-lithiating the electrode by transferring lithium ions from the magnesium-lithium alloy to the electrode. Also, the method includes electrochemically disconnecting the magnesium-lithium alloy from the electrode.

15 Claims, 5 Drawing Sheets

PRE-LITHIATION OF BATTERY ELECTRODE MATERIAL

INTRODUCTION

The technical field generally relates to lithium ion battery cells, and more particularly relates to pre-lithiation of electrodes in lithium ion batteries.

High-energy density, electrochemical cells, such as lithium ion batteries can be used in a variety of consumer products including personal electronics, power tools, lawn and garden equipment, motorized wheelchairs, toys, and for transportation. An exemplary use in transportation includes vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often a stack of lithium ion battery cells is electrically connected to increase overall output. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling, the anode function may be associated with the positive electrode rather than the negative electrode (e.g., the negative electrode may be an anode on discharge and a cathode on charge).

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium ion battery. By way of non-limiting example, cathode materials for lithium batteries typically comprise an electroactive material which can be intercalated with lithium ions, such as lithium-transition metal oxides or mixed oxides of the spinel type, for example spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. The negative electrode typically includes a lithium insertion material or an alloy host material.

Typical electroactive materials for forming an anode include lithium-graphite intercalation compounds, lithium-silicon intercalation compounds, lithium-tin intercalation compounds, and lithium alloys.

Many conventional Li-ion batteries can suffer from capacity fade attributable to many factors, including the formation of passive film known as solid electrolyte interphase (SEI) layer over the surface of the negative electrode (anode), which is often generated by reaction products of anode material, electrolyte reduction, and/or lithium ion reduction. Active material ($Li^+$) in the positive electrode can thus form a stable film on surfaces of the electrodes. During the formation and initiation period, active lithium is lost as it passivates the negative electrode. This irreversible reaction, observed in the initial charging cycle, leads to the formation of a stable passive film on the anode. Hence, a portion of an initial amount of lithium present in a battery cell is incorporated into the formation of the SEI resulting in a high irreversible capacity loss (IRCL). The SEI layer formation plays a significant role in determining electrode behavior and properties including cycle life, irreversible capacity loss, high current efficiency, and high rate capabilities, particularly advantageous for power battery and start-stop battery use. Typically, 10-20% of the lithium present in the battery is irreversibly lost during this initial cycle.

To compensate for initial loss of lithium (e.g., in the SEI), extra lithium capacity may be incorporated onto the positive electrode of the battery. However, this approach reduces the energy density of the battery and potentially leads to undesirable lithium plating on the negative electrode. It would be desirable to develop methods of forming high power lithium ion batteries with materials that counteract initial loss of lithium capacity to minimize capacity fade and maximize charge capacity for long-term use. Furthermore, other desirable features and characteristics of embodiments herein will become apparent from the subsequent detailed description and the appended claims, taken in conjunction with the accompanying drawings and the foregoing technical field and background.

SUMMARY

A method for making a pre-lithiated electrode for a lithium ion battery cell, a method for making a battery with a pre-lithiated electrode, and an electric vehicle with a pre-lithiated electrode are provided. An exemplary method for making a pre-lithiated electrode for a lithium ion battery cell includes electrochemically connecting a magnesium-lithium alloy to an electrode. Further, the method includes pre-lithiating the electrode by transferring lithium ions from the magnesium-lithium alloy to the electrode. Also, the method includes electrochemically disconnecting the magnesium-lithium alloy from the electrode.

An exemplary method further includes, before electrochemically connecting the magnesium-lithium alloy to the electrode, determining a selected amount of lithium ions to be transferred to the electrode, and forming the magnesium-lithium alloy with the selected amount of lithium ions. In some embodiments of the exemplary method, forming the magnesium-lithium alloy with the selected amount of lithium ions comprises forming the magnesium-lithium alloy with at least 10 wt. % lithium and forming the magnesium-lithium alloy as a sheet. In some embodiments of the exemplary method, forming the magnesium-lithium alloy with the selected amount of lithium ions comprises extruding the magnesium-lithium alloy into a desired shape.

In an exemplary method, electrochemically connecting the magnesium-lithium alloy to the electrode comprises electrochemically connecting the magnesium-lithium alloy to a plurality of electrodes, pre-lithiating the electrode by transferring lithium ions from the magnesium-lithium alloy to the electrode comprises pre-lithiating the electrode by transferring lithium ions from the magnesium-lithium alloy to the plurality of electrodes, and electrochemically disconnecting the magnesium-lithium alloy from the electrode comprises electrochemically disconnecting the magnesium-lithium alloy from the plurality of electrodes.

In an exemplary method, the magnesium-lithium alloy is comprised of at least 98 wt. % of magnesium and lithium, based on the total weight of the alloy.

In an exemplary method, the electrode has a desired state of charge (SoC) of less than 100%, and pre-lithiating the electrode by transferring lithium ions from the magnesium-lithium alloy to the electrode comprises providing the electrode with the desired SoC without discharge of lithium ions.

In an exemplary method, the electrode has a desired state of charge (SoC) of less than 100%, and pre-lithiating the electrode by transferring lithium ions from the magnesium-lithium alloy to the electrode comprises providing the electrode with an SoC of 100% and thereafter discharging lithium ions from the electrode.

In an exemplary method, pre-lithiating the electrode by transferring lithium ions from the magnesium-lithium alloy to the electrode comprises de-alloying the magnesium-lithium alloy to form a porous magnesium-rich microstructure having a lithium content of less than 10 wt. % lithium.

In an exemplary method, pre-lithiating the electrode by transferring lithium ions from the magnesium-lithium alloy to the electrode comprises de-alloying the magnesium-lithium alloy to form a porous magnesium-rich microstructure having a lithium content of less than 1 wt. % lithium.

In an exemplary method, pre-lithiating the electrode by transferring lithium ions from the magnesium-lithium alloy to the electrode comprises de-alloying the magnesium-lithium alloy to form a porous magnesium-rich microstructure having a lithium content of less than 0.1 wt. % lithium.

In another embodiment, a method for making a battery with a pre-lithiated anode, the method is provided. The method includes arranging a cathode, cathode/anode separator, and non-lithiated anode adjacent one another; electrochemically connecting a magnesium-lithium alloy to the anode; pre-lithiating the anode by transferring lithium ions from the magnesium-lithium alloy to the anode, thereby forming the pre-lithiated anode from the anode and a porous magnesium-rich microstructure from the magnesium-lithium alloy; electrochemically disconnecting the magnesium-lithium alloy from the porous magnesium-rich microstructure; and electrochemically connecting the pre-lithiated anode to the cathode for operation of the battery.

In an embodiment of the method, the porous magnesium-rich microstructure has a lithium content of less than 10 wt. %.

In an embodiment of the method, electrochemically connecting the magnesium-lithium alloy to the anode comprises locating the magnesium-lithium alloy adjacent to the anode, and the method further comprises positioning a pre-lithiation separator between the anode and the magnesium-lithium alloy.

In an embodiment of the method, electrochemically connecting the magnesium-lithium alloy to the anode comprises locating the magnesium-lithium alloy adjacent to the anode, and the method further comprises keeping the porous magnesium-rich microstructure adjacent to the anode during operation of the battery.

In an embodiment of the method, electrochemically connecting the magnesium-lithium alloy to the anode comprises locating the magnesium-lithium alloy adjacent to the anode, and the method further comprises removing the porous magnesium-rich microstructure from the battery before operation of the battery.

In yet another embodiment, an electric vehicle is provided. The electric vehicle comprises a vehicle chassis and a battery pack assembly including a lithium ion battery cell. The lithium ion battery cell includes a cathode; a pre-lithiated anode electrochemically connected to the cathode; and a porous magnesium-rich microstructure electrochemically disconnected from the pre-lithiated anode.

In an exemplary electric vehicle, the porous magnesium-rich microstructure has a lithium content of less than 10 wt. %.

In an exemplary electric vehicle, the porous magnesium-rich microstructure has a lithium content of less than 1 wt. %.

In an exemplary electric vehicle, the porous magnesium-rich microstructure has a lithium content of less than 0.1 wt. %.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified.

The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated. As used herein, the "%" or "percent" described in the present disclosure refers to the weight percentage unless otherwise indicated. Further, terms such as "above," "below," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. Further, the term "cathode" as used herein is provided with the conventional understanding of "positive electrode" and "anode" as used herein is provided with the conventional understanding of "negative electrode" in a lithium ion battery or cell where lithium ions are passed between the anode and cathode.

It is noted that silicon anodes, as well as some other types of anodes, in lithium ion battery cells must be pre-lithiated for performance reasons. Specifically, during lithiation, such anodes may experience large expansion, such as of up to 300%, and may experience compromised structural integrity. Further, lithiation irreversibly consumes lithium which, if the consumed lithium comes from the operating cathode, reduces battery capacity. Pre-lithiation with an additional source of lithium (in addition to the operating cathode), therefore, can increase battery capacity by 35%, providing more driving range to an electric vehicle for example.

Embodiments herein are related to the pre-lithiation of anodes in lithium ion battery cells. More specifically, embodiments herein related to the use of a magnesium-lithium alloy as the source of lithium ions during pre-lithiation of anodes in lithium ion battery cells. The amount of lithium (and the amount of magnesium) in the lithium source can be selected such that no lithium remains in the lithium source after the lithiation process. Alternatively, the amount of lithium (and the amount of magnesium) in the lithium source can be selected such that a selected low amount of lithium remains in the lithium source after the lithiation process. In this manner, the amount of lithium wasted is reduced.

Further, embodiments herein described methods and batteries in which the additional lithium source may remain in the battery, i.e., not be removed after pre-lithiation, without large detriment to battery efficiency. Specifically, the added weight of the additional lithium source after pre-lithiation is minor compared to the battery weight, and compared to the increase in battery capacity afforded by use of the additional lithium source. It is noted that certain exemplary embodiments may provide for removal of the lithium source after pre-lithiation.

Figure 1:
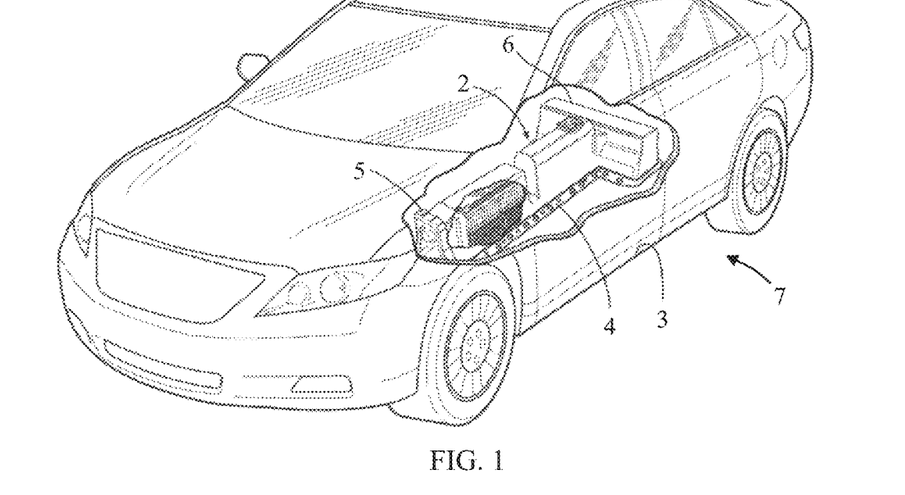
FIG. 1 is a schematic, perspective view of an electric vehicle with a cut-away section to reveal a battery pack assembly in accordance with an embodiment.

Referring now to FIG. 1, wherein like reference numbers correspond to like or similar components wherever possible throughout the several figures, an electric vehicle 1 having a high voltage battery pack assembly 7 provided with a battery module 2 is shown. The exemplary battery module 2 includes a plurality of lithium ion batteries. Further, the battery pack assembly 7 may include a plurality of battery modules 2. Also, while FIG. 1 illustrates a battery module 2, it is envisioned that the battery pack assembly 7 may not include any battery module 2, such as in a cell-pack design. The exemplary electric vehicle 1 includes a vehicle chassis 3 and a battery tray 4. In the illustrated embodiment, the battery module 2 attaches to the battery tray 4. Further, the battery tray 4 attaches to the vehicle chassis 3 to secure the pack assembly 7 to the electric vehicle 1.

The exemplary electric vehicle 1 may also include a battery disconnect unit (BDU) 5, which is connected to the pack assembly 7 and provides electrical communication between the pack assembly 7 and an electrical system (not shown) of the electric vehicle 1. The exemplary electric vehicle 1 may further include a battery cover 6 that extends around the battery module 2. The exemplary battery cover 6 may protect the battery module 2 from being damaged, as well as provide electrical insulation from the high voltage of the battery pack assembly 7.

Figure 2:
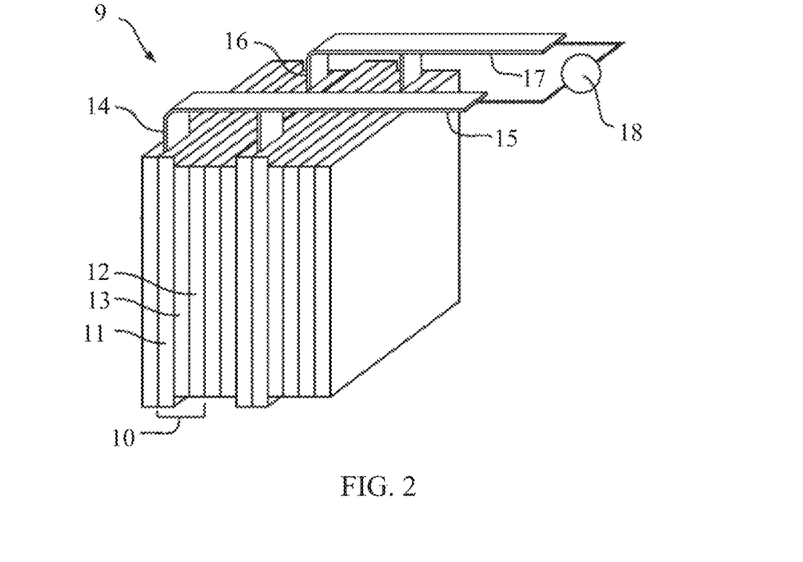
FIG. 2 is a schematic of an exemplary lithium ion battery that includes several adjacent electrochemical battery cells in accordance with an embodiment.

FIG. 2 illustrates an exemplary and generalized lithium ion battery 9 included in the battery pack assembly 7 of FIG. 1. In FIG. 2, the lithium ion battery 9 is shown to include several rectangular-shaped electrochemical battery cells 10 that are each bracketed by metallic current collectors. The electrochemical battery cells 10 are stacked side-by-side in a modular configuration and connected in series (although a parallel connection is also permitted). The lithium ion battery 9 can be connected serially or in parallel to other similarly constructed lithium ion batteries to form a lithium ion battery pack that exhibits the voltage and current capacity demanded for a particular application. It should be understood the lithium ion battery 9 shown here is only a schematic illustration. FIG. 1 is meant to show the relative position and physical interactions of the various components that constitute the electrochemical battery cells 10 (i.e., the electrodes and the separator); it is not intended to inform the relative sizes of the electrochemical battery cells' components, to define the number of electrochemical battery cells 10 in the lithium ion battery 9, or to limit the wide variety of structural configurations the lithium ion battery 9 may assume. Various structural modifications to the lithium ion battery 9 shown in FIG. 1 are possible despite what is explicitly illustrated.

The electrochemical battery cell 10 contained in the lithium ion battery 9 includes a negative electrode 11, a positive electrode 12, and a separator 13 situated between the two electrodes 11, 12. Each of the negative electrode 11, the positive electrode 12, and the separator 13 is wetted with a liquid electrolyte solution that is able to communicate lithium ions. A negative-side metallic current collector including a negative polarity tab 14 is located between the negative electrodes 11 of adjacent electrochemical cells 10. The negative polarity tab 14 is electrically coupled to a negative terminal 15. Likewise, a positive-side metallic current collector including a positive polarity tab 16 is located between neighboring positive electrodes 12. The positive polarity tab 16 is electrically coupled to a positive terminal 17.

The electrochemical cell 10 is generally thin and flexible. A typical thickness of the electrochemical cell 10 extending from the outer face surface of the negative electrode 11 to the outer face surface of the positive electrode 12 is about 80 μm to about 350 μm. Each electrode 11, 12 is may be from about 30 μm to 150 μm thick and the separator 13 may be from about 20 μm to 50 μm thick. The metallic current collectors are normally about 5 μm to 20 μm thick. The relatively thin and flexible nature of the electrochemical battery cell 10 and its associated metallic current collectors allows them to be rolled, folded, bent, or otherwise maneuvered into a variety of lithium ion battery configurations depending on design specifications and spatial constraints. The lithium ion battery 9 may, for example, include a number of distinct electrochemical battery cells 10 that have been fabricated, cut, aligned, and positioned next to one another or, in an alternative embodiment, the cells 10 may be derived from a continuous layer that is folded back-and-forth over itself many times.

The negative electrode 11 includes a lithium host material that stores intercalated lithium at a relatively low electrochemical potential (relative to a lithium metal reference electrode) such as, for example, silicon, graphite or lithium titanate. The negative electrode may include other anode active materials selected from graphite, tin, silicon, silicon oxide, antimony, phosphorus, lithium, hard carbon, soft carbon, and mixtures thereof. The lithium host material may be intermingled with a polymeric binder material to provide the negative electrode 11 with structural integrity. An exemplary polymeric binder material is one or more of polyvinyldiene fluoride (PVdF), an ethylene propylene diene monomer (EPDM) rubber, or a carboxymethoxy cellulose (CMC). Graphite is normally used to make the negative electrode 11 because, on top of being relatively inert, its layered structure exhibits favorable lithium intercalation and deintercalation characteristics which help provide the electrochemical battery cell 10 with a suitable energy density. Commercial forms of graphite that may be used to construct the negative electrode 11 are available from Timcal Graphite and Carbon (headquartered in Bodio, Switzerland), Lonza Group (headquartered in Basel, Switzerland), and Superior Graphite (headquartered in Chicago, Ill.). The negative-side metallic current collector associated with the negative electrode 11 is preferably a thin-film copper foil that coextensively contacts the outer face surface of the negative electrode 11.

The positive electrode 12 includes a lithium-based active material that stores intercalated lithium at a higher electrochemical potential than the lithium host material used to make the negative electrode 11 (also relative to a lithium metal reference electrode). The same polymeric binder materials that may be used to construct the negative electrode 11 (PVdF, EPDM, CMC) may also be intermingled with the lithium-based active material to provide the positive electrode 12 with structural integrity. The lithium-based active material is preferably a layered lithium transition metal oxide, such as lithium cobalt oxide ($LiCoO_2$), a spinel lithium transition metal oxide, such as spinel lithium manganese oxide ($LiMn_xO_y$), a lithium polyanion, such as a nickel-manganese-cobalt oxide $[Li(Ni_xMn_yCO_z)O_2]$, lithium iron phosphate ($LiFePO_4$), or lithium fluorophosphate ($Li_2FePO_4F$), or a mixture of any of these materials. Some other suitable lithium-based active materials that may be employed as all or part of the lithium-based active material include lithium nickel oxide ($LiNiO_2$), lithium aluminum manganese oxide ($Li_xAl_yMn_{1-y}O_2$) and lithium vanadium oxide ($LiV_2O_5$), to name but a few alternatives. The positive-side metallic current collector associated with the positive electrode 12 is preferably a thin-film aluminum foil that coextensively contacts the outer face surface of the positive electrode 12.

The separator 13 functions as a thin and electrically insulative mechanical barrier layer that physically separates the confronting inner face surfaces of the electrodes 11, 12 to prevent a short-circuit in the electrochemical battery cell 10. The separator 13 is also sufficiently porous to permit infiltration of the liquid electrolyte solution and the internal passage of dissolved lithium ions.

The liquid electrolyte solution infiltrated into the separator 13, and which wets both electrodes 11, 12, is preferably a lithium salt dissolved in a non-aqueous solvent. Some suitable lithium salts that may be used to make the liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

As shown, the negative and positive terminals 15, 17 of the lithium ion battery 9 may be connected to an electrical device 18 that generally encompasses power-consuming and power-generating devices. A power-consuming device is one that is powered fully or partially by the lithium ion battery 9 when operating in a discharge state. Conversely, a power-generating device is one that charges or re-powers the lithium ion battery 9. The power-consuming device and the power-generating device can be the same device in some instances. For example, the electrical device 18 may be an electric motor for a hybrid electric or an extended range electric vehicle that is designed to draw an electric current from the lithium ion battery 9 during acceleration and provide a regenerative electric current to the lithium ion battery 9 during deceleration. The power-consuming device and the power-generating device can also be different devices. For example, the power-consuming device may be an electric motor for a hybrid electric or an extended range electric vehicle and the power-generating device may be an AC wall outlet, an internal combustion engine, and/or a vehicle alternator.

The lithium ion battery 9 can provide a useful electrical current to the electrical device 18 by way of reversible electrochemical reactions that occur in the electrochemical battery cell 10 when a closed-circuit connects the negative terminal 15 and the positive terminal 17 at a time when the negative electrode 11 contains a sufficient quantity of intercalated lithium (i.e., battery discharge). The electrochemical potential difference between the negative electrode 11 and the positive electrode 12 drives the oxidation of intercalated lithium contained in the negative electrode 11. Free electrons produced by this oxidation reaction are collected by the negative-side current collector and supplied to the negative terminal 15. A flow of free electrons is harnessed and directed through the electrical device 18 from the negative terminal 15 to the positive terminal 17 and eventually to the positive electrode 12 by way of the positive-side current collector. Lithium ions, which are also produced at the negative electrode 11, are concurrently carried through the separator 13 by the liquid electrolyte solution in route to the positive electrode 12. The flow of free electrons through the electrical device 18 from the negative terminal 15 to the positive terminal 17 can be continuously or intermittently provided until the negative electrode 11 is depleted of intercalated lithium and the capacity of the electrochemical battery cell 10 is spent.

The lithium ion battery 9 can be charged or re-powered at any time by applying an external voltage originating from the electrical device 18 to the electrochemical battery cell 10 to reverse the electrochemical reactions that occur during discharge. The applied external voltage compels the otherwise non-spontaneous oxidation of intercalated lithium contained in the positive electrode 12 to produce free electrons and lithium ions. The free electrons are collected by the positive-side current collector 16 and supplied to the positive terminal 17. A flow of the free electrons is directed to the negative terminal 15 and eventually to the negative electrode 11 by way of the negative-side current collector 14. The lithium ions are concurrently carried back through the separator 13 in the liquid electrolyte solution towards the negative electrode 11. The lithium ions and the free electrons eventually reunite and replenish the negative electrode 11 with intercalated lithium to prepare the electrochemical battery cell 10 for another discharge phase.

FIGS. 3-6 provide schematic cross-sectional views, not-to-scale, of an exemplary method 80 for making a lithium ion battery cell 100, such as one of the cells 10 described in the battery 9 of FIG. 2, including a pre-lithiated anode with intercalated lithium. The pre-lithiation process of the method 80 forms a solid electrolyte interface (SEI) on a surface or surfaces of the anode 105. In each pre-lithiated anode 105, the SEI provides a protective interface on the porous particle anode layers, enabling the subsequent intercalation of lithium ions from the electrolyte and de-intercalation of lithium ions into the electrolyte during charging and discharging cycles of the cell.

Figure 3:
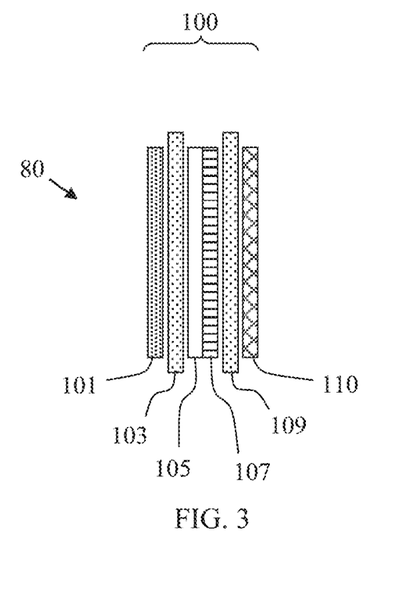
FIGS. 3-6 are schematic cross-sectional views of a method for pre-lithiating the anode of an exemplary lithium ion battery cell with a magnesium-lithium alloy lithium source in accordance with an embodiment.

FIG. 3 illustrates the cell 100 before a pre-lithiation process is performed. As shown in FIG. 3, the method 80 includes providing the exemplary cell 100 including a cathode 101, a separator 103, a non-lithiated anode 105, i.e., an anode that has not undergone the pre-lithiation process described herein and lacks intercalated lithium ions, a current collector 107, an optional separator 109, and a lithium source 110 in the form of a magnesium-lithium alloy. It is noted that separator 109 next to the lithium source 110 is necessary only if there is a possibility that the electrodes will physically touch the lithium ion source 110 and form an electrical path. The lithium source 110 may be selected as described below to provide a specific desired amount of lithium ions to the anode 105 during a pre-lithiation process. Further, the lithium source 110 may be provided in a desired physical form, such as a sheet, a rolled sheet, an extruded bar, plug or other member, or the like.

While FIG. 3 illustrates separator 109 between the current collector 107 and the lithium source 110, other embodiments do not include the separator 109, such that the current collector 107 is directly adjacent to the lithium source 110. The lithium source 110 may generally correspond in size and shape with the anode 105.

The cell 100 may be located in a suitable container (not shown) containing an electrolyte solution, such as, in a non-limiting example, $LiPF_6$. The container may be, for example, the pouch or coin in which the finished hybrid cell is to be used.

In an exemplary embodiment, the anode 105 is formed from layer of anode material, such as silicon or graphite. Specifically, the anode 105 may include a porous layer of particles. In exemplary embodiments, the anode 105 includes micrometer-size particles (which may contain a small portion of electrically conductive carbon particles). The particles may be bonded to the current collector 107. An exemplary current collector 107 is a foil, such as a thin copper foil.

As shown, the lithium source 110 is aligned parallel to the anode 105. The lithium source 110 may be carried on a supporting member (not shown), which may be an electrically conductive copper foil. However, in some practices the lithium source 110 does not require a supporting member or an additional electrical connection.

Figure 4:
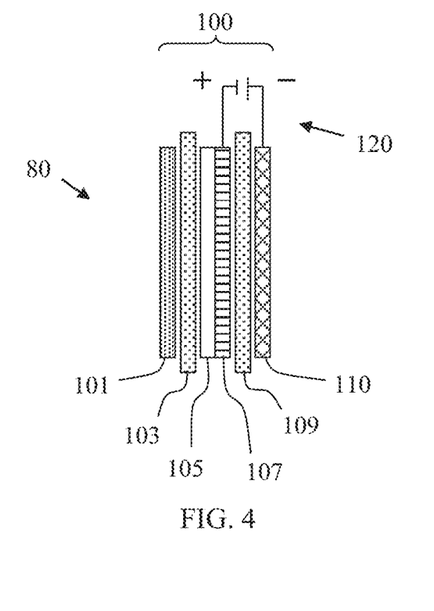

The method 80 continues in FIG. 4 by electrochemically connecting the anode 105 and the lithium source 110. For example, the method may include galvanostatic charging through a second and third terminal, collectively indicated by reference number 120, of the inherently positively charged anode layer(s) 105 and the negatively-charged lithium source 110 in the electrolyte solution. In this galvanostatic process, lithium cations supplied from lithium source 110 enter the electrolyte solution and migrate through the electrolyte solution to the porous layers of anode material in anode 105 on current collector 107.

Optionally, a suitable low charging current may be used to enhance the formation of a suitable SEI on the anode 105. Lithium cations and non-aqueous solvent molecules interact with the material layers of the anode 105 to form the desired SEI coating on the anode 105. The amount of lithium that is incorporated into the anode material may be controlled by the duration of the charging time in a constant current mode or, more typically, by a set voltage cutoff when the charge rate is variable. An exemplary method may utilize a constant current mode, or a constant current mode followed by a constant voltage mode. Generally, the time integration of the current dictates the amount of lithium incorporated into the anode material.

In another embodiment, an electrical connection (for example, a short circuit using an electric wire), not specifically illustrated in FIG. 4, is made, for example, between the current collector 107 carrying the anode 105 and an electrically conductive member to which the lithium source 110 is attached. In this short-circuit process, lithium cations supplied from lithium source 110 enter the electrolyte solution and migrate through the electrolyte solution to the porous layers of material forming the anode 105 on current collector 107. In this method, the short-circuit connection between anode 105 and lithium source 110 or its supporting member (e.g., a copper current collector) enhances the pre-lithiation process. Apart from the short circuit connection, the lithium source HO and the anode 105 are not in physical contact. They are supported in a closely spaced-apart assembly in the electrolyte, or a porous polymeric separator layer 109 is placed between the facing surfaces of the lithium source 110 and the anode 105. Lithium cations and non-aqueous solvent molecules interact with the material layers of the anode 105 to form the desired SD coating on the anode 105.

In yet another related pre-lithiation method for anodes 105, a side of the lithium source 110 may be placed directly against one (or both) sides of the anode 105. Again, the use of a support member or electrical connector may not be required in this embodiment. The touching members 105, 110 (no separator required) are immersed in a lithium cation conducting electrolyte in a suitable container. Alternatively, with a suitably small amount of electrolyte, no container may be required. Rather, the pores of each electrode and separators are carefully infiltrated with a selected non-aqueous liquid electrolyte. The pre-lithiation process could be conducted in an oxygen/water-free environment. Again, in this process, lithium cations supplied from the lithium source 110 enter the electrolyte solution and migrate through the electrolyte solution to the porous layers of the anode 105 on current collector 107. This direct contact method may provide rapid and controllable (by contact time) pre-lithiation of the porous layer(s) of anode 105 due to the formation of an almost zero-gap between the material layer(s) of anode 105 and the lithium source 110.

In exemplary embodiments, the magnesium-lithium alloy lithium source 110 can be used to directly bring the anode 105 to a desired state of charge (SoC) by filling the anode 105 with lithium ions during the described charge process and by not performing any process to discharge lithium ions therefrom afterwards. As a result, less lithium is utilized.

In other embodiments, the magnesium-lithium alloy lithium source can be used to fully lithiate the anode 105 to 100% SOC and lithium ions may later be discharged from the anode 105 to bring the anode 105 to the desired SOC. While such embodiments require more lithium in the alloy lithium source 110, the anode 105 is fully cycled.

The above-described methods describe easy-to-perform methods of using a non-disposable lithium source to pre-lithiate anodes, such as newly made anodes for use in a battery. Obviously, in the selection of one of the pre-described pre-lithiation methods, the selection of a container configuration (if a container is actually required) and electrolyte containment is adapted to process a number of anodes (or anode layers) requiring the formation of the solid electrolyte, interface in the porous anode layers.

Obviously, a pre-determined number of anodes and a suitable number of suitably placed lithium sources may be processed in a moisture-free, electrolyte-containing vessel or container, or without such a container in embodiments herein.

Figure 5:
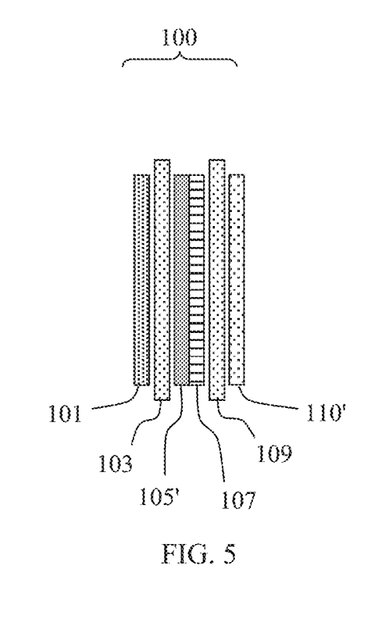

At the completion of this pre-lithiation process of FIG. 4, the original porous layers of the anode 105 are pre-lithiated, thereby forming the pre-lithiated anode 105' shown in FIG. 5. Further, as shown in the FIG. 5, after lithiating the anode, the magnesium-lithium alloy de-alloys and forms a porous magnesium-rich microstructure 110', such as a scaffold. As a result, the likelihood of lithium dendrite growth during pre-lithiation cycles is reduced, unlike lithiation performed with a lithium source of pure lithium. As shown in FIG. 5, the method 80 includes electrochemically disconnecting the pre-lithiated anode 105' from the porous magnesium-rich microstructure 110'.

Figure 6:
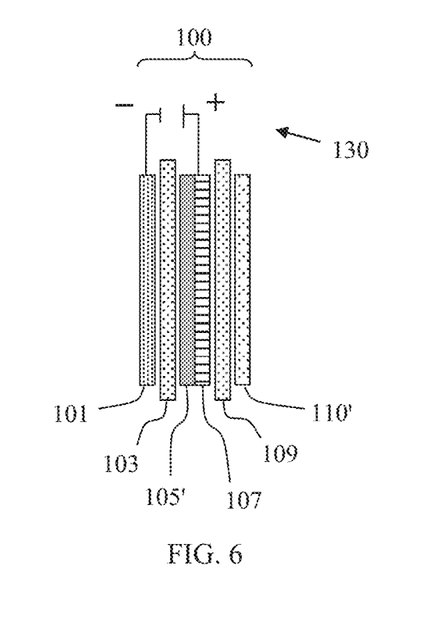

In exemplary embodiments, the cell 100 of FIG. 5 is ready for use in a lithium battery such as, for example, the battery 9 of FIG. 2. FIG. 6 illustrates such use. In FIG. 6, the method includes electrochemically connecting the pre-lithiated anode 105' and the cathode 101. For example, electric charges may be applied through a first and second terminal, collectively indicated by reference number 130. Specifically, the pre-lithiated anode 105' is negatively charged and the cathode 101 is positively charged when cell 100 is being discharged during operation of the battery.

It is noted that in FIG. 6, the method includes operation of the battery while the porous magnesium-rich microstructure 110' remains located adjacent to the pre-lithiated anode 105'. It is also envisioned that the method may include removing the porous magnesium-rich microstructure 110' before operation of the battery.

Figure 7:
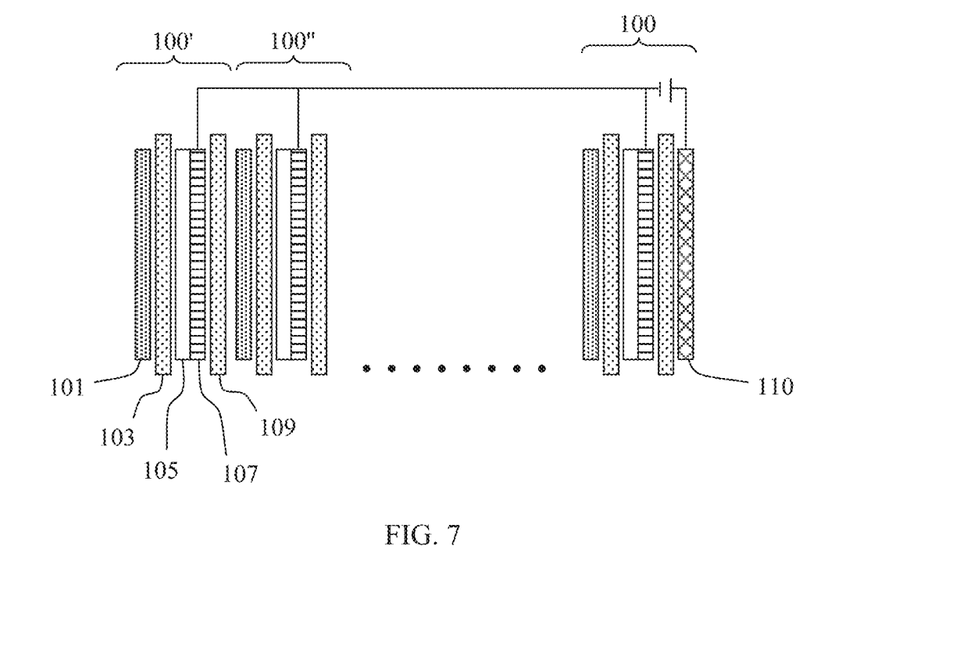
FIG. 7 is a schematic cross-sectional view of a magnesium-lithium alloy electrochemically connected to a plurality of anodes in a battery for pre-lithiating according to the method of FIGS. 3-6 and in accordance with an embodiment.

While FIGS. 3-6 illustrate a single lithium ion battery cell 100 for used with the lithium source 110, it is envisioned that a single lithium source 110 could be used to pre-lithiate the anodes of a plurality of cells 100. FIG. 7 is a schematic illustrating such an embodiment. In FIG. 7, cells 100, 100' and 100" represent a plurality of any desired suitable number of cells. As shown, the cells 100, 100' and 100" include respective cathodes 101, separators 103, non-lithiated anodes 105, current collectors 107, and separators 109.

(Again, it is noted that the separator next to the lithium source 110 is necessary only if there is a possibility that the electrodes will physically touch the lithium ion source 110 and form an electrical path)

Further, the cells 100, 100' and 100" share lithium source 110, such that lithium ions from the lithium source 110 may be added to the anodes 105 of each cell 100, 100' and 100".

Figure 8:
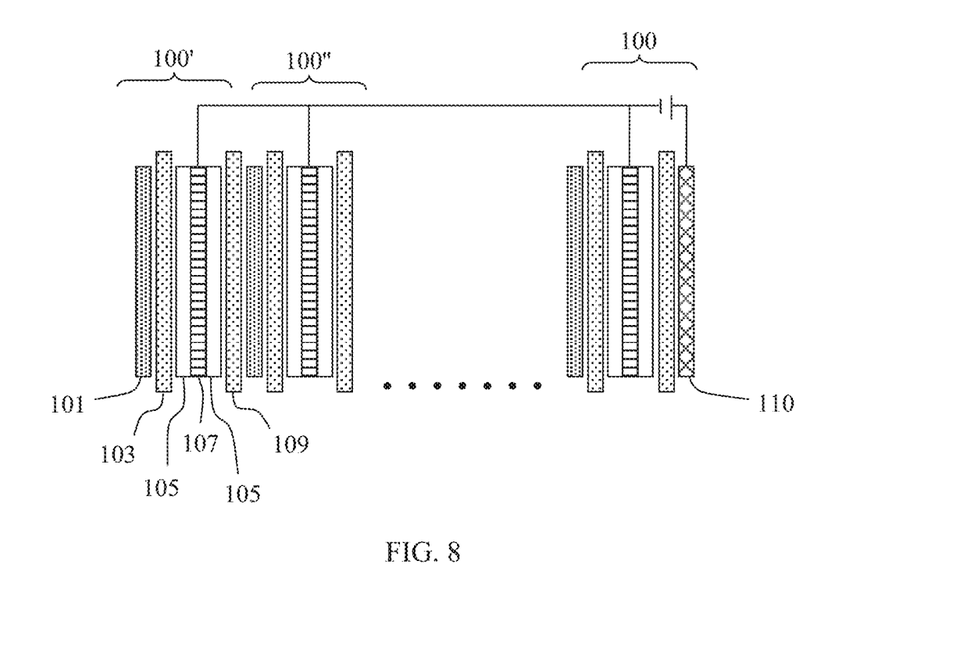
FIG. 8 is a schematic cross-sectional view of a battery similar to FIG. 7, but with double-sided anodes in accordance with an embodiment.

FIG. 8 is a schematic perspective view of an embodiment similar to that of FIG. 7, in which the cells 100, 100' and 100", are provided with double-sided anodes 105. It is to be understood that any anodes 105 described herein may be provided as single-sided, as shown in FIGS. 3-7, or double-sided, as shown in FIG. 8.

Figure 9:
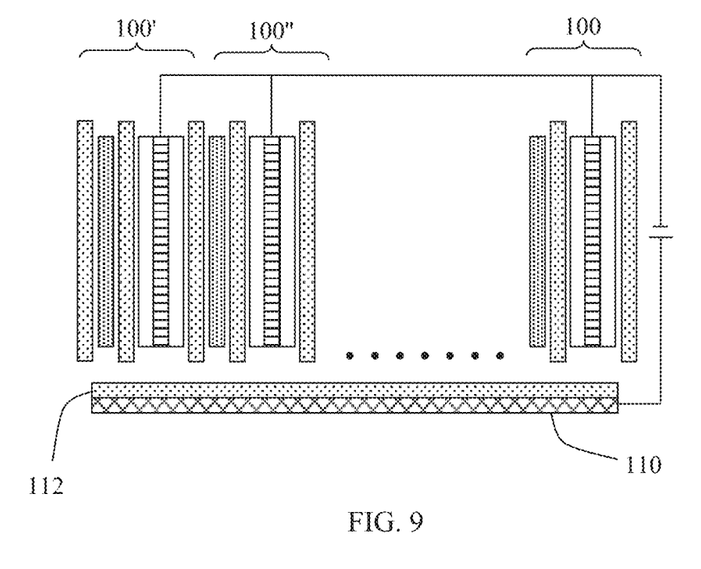
FIG. 9 is a schematic of another embodiment of an exemplary lithium ion battery cell with a magnesium-lithium alloy lithium source.

In exemplary embodiments of the cells 100 of FIGS. 3-8, among other suitable possibilities, the lithium source 110 may be a sheet or foil having a length and width equal to that of the anodes 105. In FIG. 9, an embodiment is illustrated in which the lithium source 110 may be provided as a bar or rod formed by extrusion or other generally less expensive processing.

As shown in FIG. 9, the cathode, separators, anode, and collector components of the cells 100, 100' and 100" remain aligned and substantially parallel. However, the lithium source 110 is arranged perpendicular to the components of the cells 100, 100' and 100", at a selected same distance from the ends of each anode in the cells 100, 100' and 100", rather than at a distance from a side of the anode of cell 100, as in FIGS. 3-8. An additional optional separator 112 may be provided between the lithium source 110 and the anodes of the cells 100, 100' and 100" if there is a possibility that an electrode will physically touch the lithium source HO and form an electrical path. In exemplary embodiments, it is possible to use the lithium source 110 space as the outgassing bag so that the de-alloyed lithium source can be removed after formation instead of leaving the de-alloyed lithium source in the battery or instead of introducing additional processes in the method dedicated to removing the de-alloyed lithium source after pre-lithiation.

Figure 10:
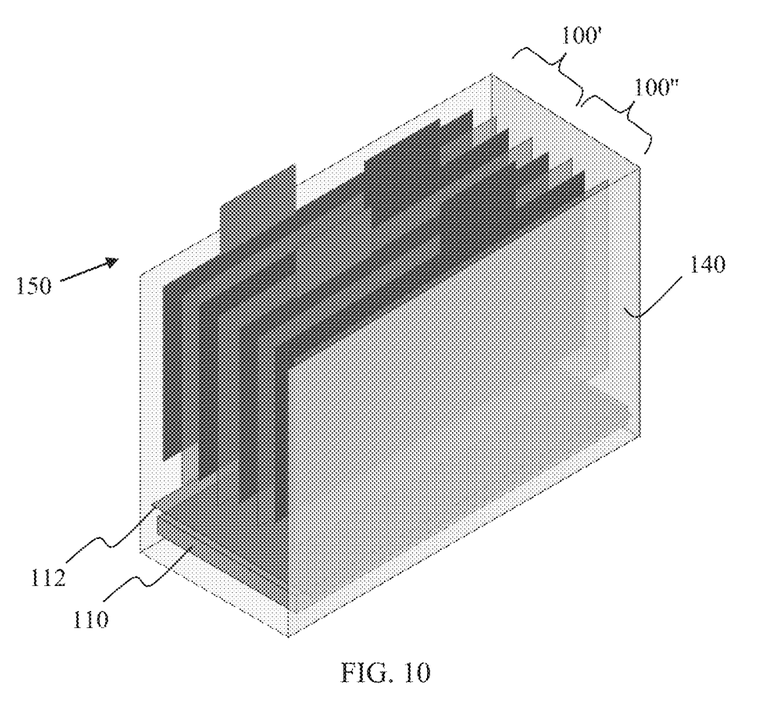
FIG. 10 is a perspective view of the embodiment of FIG. 9.

FIG. 10 is a perspective schematic showing an embodiment of cells 100' and 100", representing all cells 100, as arranged in FIG. 9. In FIG. 10, the cells 100' and 100", the lithium source 110; and the optional separator 112 are received in a container 140. Tabs 150 for electrical connections extend from the anodes and cathodes of cells 100' and 100".

As referred to above, the lithium source 110 may be formed with a specific desired amount of lithium ions to be added to the anode 105 during the pre-lithiation process. Thus, the method 80 for making a lithium ion battery cell 100 may include a process for determining a selected amount of lithium ions to be provided in the lithium source, as well as a process for forming the lithium source with the selected amount of lithium ions. Specifically, the method 80 may include tuning the magnesium-lithium alloy composition to match the desired anode capacity to enable a full pre-lithiation cycle with no residual lithium excess.

The method may use the following formula to determine the selected amount of lithium in magnesium-lithium alloy lithium source:

$$X^{Li}(Wt. \%) = \frac{100 * Alloy_{Cap}(\text{mAh}/\text{cm}^2) * \rho_{Li}}{Li_{Cap} * \rho_{Mg} * \rho_{Li} * \text{Thick(cm)} + Alloy_{Cap}(\text{mAh}/\text{cm}^2) * (\rho_{Li} * \rho_{Mg})}$$

In the formula, $X^{Li}$ is the selected amount of lithium, in weight percentage based on the total weight of the magnesium-lithium alloy; Alloy$_{Cap}$ is the desired areal capacity of the lithium source in mAh/cm$^2$; $\rho_{Li}$ is the density of lithium in g/cm$^3$ which is 0.534, $\rho_{Mg}$ is the density of magnesium in g/cm$^3$ which is 1.738, Li$_{Cap}$ is the capacity of lithium, which is 3860 mAh/g, and Thick is the thickness of the lithium-magnesium alloy in cm. The formula does not require that the anode and the lithium-magnesium source have the same area. In practice, the area of the lithium source may be selected so that the overall capacity matches what is desired. In fact, as the anode and the lithium source do not need to have the same area, the total alloy capacity of a cell can be modified with one or all of the following: area, thickness, and areal capacity. In other words, the capacity can be tuned by changing geometry, such as thickness, or by changing alloy composition. Further, while the above formula is useful when using thin foils, for an extruded rod or other shapes the formula may use volumetric units and total capacity.

Based on this formula, the amount of lithium in the magnesium-lithium alloy can be selected such that no residual lithium, or a selected low amount of residual lithium remains in the de-alloyed magnesium-lithium scaffold, i.e., porous magnesium-rich microstructure after the pre-lithiation process takes place. This is particularly the case in embodiments wherein no lithium ions are discharged from the anode during the pre-lithiation process. For example, in exemplary embodiments, the porous magnesium-rich microstructure has a lithium content of less than 15 wt. %, such as less than 12 wt. %, for example less than 10 wt. %, such as less than 8 wt. %, for example less than 5 wt. %, such as less than 1 wt. %, for example less than 0.1 wt. % or even 0.0 wt. %. In embodiments in which the anode is fully lithiated (100% SOC) during pre-lithiation followed by discharge of lithium ions from the anode to bring the anode to the desired SoC, the porous magnesium-rich microstructure may have a lithium content of about half of the lithium content of the magnesium-lithium lithium source before the pre-lithiation process, e.g., less than 50 wt. % or other selected value.

Figure 11:
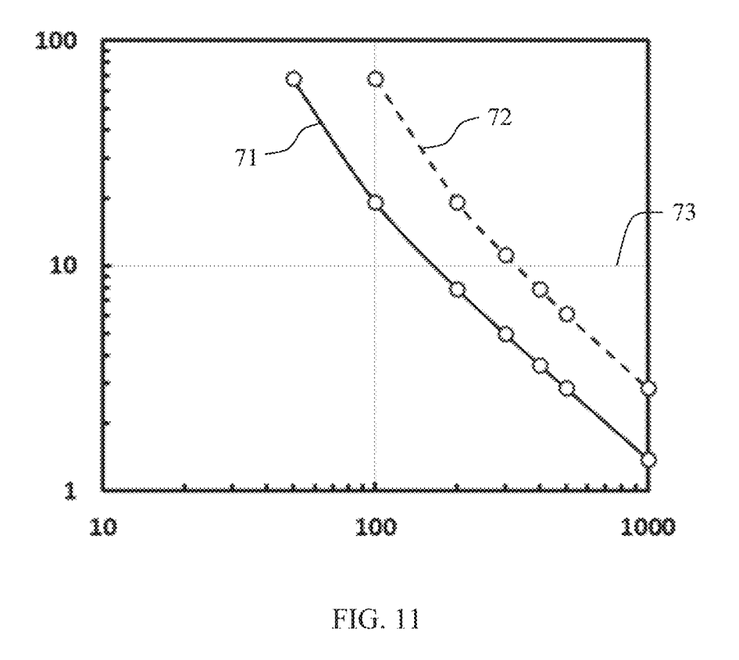
FIG. 11 is a graph illustrating the tuning of lithium content in a magnesium-lithium lithium source for pre-lithiating an anode.

FIG. 11 is a graph illustrating the tuning of a magnesium-lithium alloy for use as a lithium source during pre-lithiation. In FIG. 11, foil thickness (in μm) of an anode to be pre-lithiated is represented on the x-axis and the lithium content of the magnesium-lithium alloy (in wt. %) is represented on the γ-axis. Line 71 and line 72 represent the amount of lithium in a magnesium-lithium alloy needed to pre-lithiate a single-sided anode (Line 71) and a double-sided anode (Line 72) with an exemplary selected anode capacity of 9 mAh/cm$^2$ at various anode foil thicknesses. Further, it is noted that in exemplary embodiments, the magnesium-lithium alloy is produced as a β-phase having a BCC structure which is easily rolled or melt-spun into thin sheets. The magnesium-lithium alloy is produced as a β-phase having a BCC structure primarily when it has a lithium content of at least 10.2 wt % (represented by line 73 in FIG. 11). Thus, for embodiments in which the magnesium-lithium alloy is utilized in the form of a sheet, foil or other thin rolled substrate, the selection of the amount of lithium in the magnesium-lithium alloy or the design of the anodes may be informed by the graph of FIG. 11.

It is further noted that, for embodiments in which the spent, de-alloyed lithium source is not removed from the battery pack before use of the battery, the battery pack weight is not substantially increased. For example, a typical electric vehicle battery pack weight may be 430 kg with performance of 60 kWh at 3.63 volts, thus requiring a battery capacity of 16.6 kAh. For a double-sided silicon anode with a capacity ratio of negative to positive electrodes (N:P ratio) of 2, i.e., 9 mAh/cm$^2$: 4.5 mAh/cm$^2$, a magnesium-lithium alloy lithium source having 1800 mAh/cm$^3$ (100% lithiation); and assuming a lithium content of 68 wt. % lithium in the magnesium-lithium lithium source, then the total weight of the magnesium in the magnesium-lithium lithium source is about 8.6 kg. Thus, the impact on battery weight is only an increase of 2%, while the battery capacity is increased by 35% due to pre-lithiation.

For the same battery pack and magnesium-lithium lithium source, with half thickness and 50% lithiation, the total weight of the magnesium in the magnesium-lithium lithium source is about 4.3 kg. Thus, the impact on battery weight is only an increase of 1%.

In exemplary embodiments, the magnesium-lithium alloy will have a lithium content of less than 95 wt. % or less than 90 wt. %, such as less than 85 wt. %, for example less than 80 wt. %, such as less than 75 wt. %, for example less than 70 wt. %, such as less than 65 wt. %, for example less than 60 wt. %, such as less than 55 wt. %, for example less than 50 wt. %, such as less than 45 wt. %, for example less than 40 wt. %, such as less than 35 wt. %, for example less than 30 wt. %, such as less than 25 wt. %, for example less than 20 wt. %, such as less than 15 wt. %. In exemplary embodiments, the magnesium-lithium alloy will have a lithium content of greater than 10 wt. %, such as greater than 15 wt. %, for example greater than 20 wt. %, such as greater than 25 wt. %, for example greater than 30 wt. %, such as greater than 35 wt. %, for example greater than 40 wt. %, such as greater than 45 wt. %, for example greater than 50 wt. %, such as greater than 55 wt. %, for example greater than 60 wt. %, such as greater than 65 wt. %, for example greater than 70 wt. %, such as greater than 75 wt. %, for example greater than 80 wt. %, such as greater than 85 wt. %, for example greater than 90 wt. %. In an exemplary embodiment, the magnesium-lithium alloy will have a lithium content of from 50 wt. % to 90 wt. %. Other suitable ranges may be selected.

In exemplary embodiments, the magnesium-lithium alloy will have a magnesium content of less than 90 wt. %, such as less than 85 wt. %, for example less than 80 wt. %, such as less than 75 wt. %, for example less than 70 wt. %, such as less than 65 wt. %, for example less than 60 wt. %, such as less than 55 wt. %, for example less than 50 wt. %, such as less than 45 wt. %, for example less than 40 wt. %, such as less than 35 wt. %, for example less than 30 wt. %, such as less than 25 wt. %, for example less than 20 wt. %, such as less than 15 wt. %. In exemplary embodiments, the magnesium-lithium alloy will have a magnesium content of greater than 10 wt. %, such as greater than 15 wt. %, for example greater than 20 wt. %, such as greater than 25 wt. %, for example greater than 30 wt. %, such as greater than 35 wt. %, for example greater than 40 wt. %, such as greater than 45 wt. %, for example greater than 50 wt. %, such as greater than 55 wt. %, for example greater than 60 wt. %, such as greater than 65 wt. %, for example greater than 70 wt. %, such as greater than 75 wt. %, for example greater than 80 wt. %, such as greater than 85 wt. %, for example greater than 90 wt. %. In an exemplary embodiment, the magnesium-lithium alloy will have a magnesium content of from 10 wt. % to 50 wt. %. Other suitable ranges may be selected.

In addition to the magnesium and lithium present in the alloy, the alloy may include trace amounts of other elements, such as calcium or tin. In an exemplary embodiment, the magnesium-lithium alloy contains less than 2 wt. % of other elements, such as less than 1 wt. %, for example less than 0.5 wt. %, such as less than 0.1 wt. %, for example less than 0.05 wt. % of other elements.

It has been found that magnesium-lithium alloys may provide additional benefits during manufacture and handling of the magnesium-lithium alloy, during pre-lithiation processing, and after pre-lithiation. For example, magnesium-lithium alloys are air stable as compared to pure lithium, which must be handled in a dry and inert environment. Also, magnesium-lithium alloys are inexpensive as compared to pure lithium. Further, as noted above, at certain weight ratios, magnesium-lithium alloys are produced as a β-phase having a BCC structure which is easily rolled or melt-spun into thin sheets.

As described herein, magnesium-lithium alloys can effectively be used as a lithium ion source to electrochemically pre-lithiate lithium ion battery anodes via a third terminal. Pre-lithiation may be performed in a single step process where the anode is filled with a specific desired amount of lithium ions from the magnesium-lithium alloy, such that no ion discharge is performed thereby reducing the amount of lithium needed. Alternatively, the anode may be fully lithiated (100% SOC) and then upon discharging ions the anode may be brought to the desired SoC, which requires more lithium but fully cycles the anode.

As further described herein, the magnesium-lithium alloy de-alloys during the pre-lithiation process and forms a porous magnesium-rich microstructure. This minimizes the likelihood of lithium dendrite growth during pre-lithiation cycles, unlike pre-lithiation preformed with pure lithium as the lithium source.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for making a pre-lithiated electrode for a lithium ion battery cell, the method comprising:
   providing a magnesium-lithium alloy, wherein the magnesium-lithium alloy has a lithium content of at least 10.2 wt. % and a magnesium content greater than 55 wt. %;
   electrochemically connecting the magnesium-lithium alloy to an electrode;
   pre-lithiating the electrode by transferring lithium ions from the magnesium-lithium alloy to the electrode by de-alloying the magnesium-lithium alloy to form a porous magnesium-rich microstructure having a lithium content of less than 1 wt. % lithium; and
   electrochemically disconnecting the magnesium-lithium alloy from the electrode.

2. The method of claim 1 further comprising:
   before providing the magnesium-lithium alloy as a β-phase, determining a selected amount of lithium ions to be transferred to the electrode; and
   forming the magnesium-lithium alloy with the selected amount of lithium ions.

3. The method of claim 2 wherein the magnesium-lithium alloy has a magnesium content greater than 60 wt. %.

4. The method of claim 2 wherein the magnesium-lithium alloy has a magnesium content greater than 65 wt. %.

5. The method of claim 1 wherein:
   electrochemically connecting the magnesium-lithium alloy to the electrode comprises electrochemically connecting the magnesium-lithium alloy to a plurality of electrodes;
   pre-lithiating the electrode by transferring lithium ions from the magnesium-lithium alloy to the electrode comprises pre-lithiating the electrode by transferring lithium ions from the magnesium-lithium alloy to the plurality of electrodes; and
   electrochemically disconnecting the magnesium-lithium alloy from the electrode comprises electrochemically disconnecting the magnesium-lithium alloy from the plurality of electrodes.

6. The method of claim 1 wherein the magnesium-lithium alloy is comprised of at least 98 wt. % of magnesium and lithium, based on the total weight of the alloy.

7. The method of claim 1 wherein providing the magnesium-lithium alloy comprises producing the magnesium-lithium alloy as a β-phase; and wherein the method further comprises forming a thin sheet from the magnesium-lithium alloy before electrochemically connecting the magnesium-lithium alloy to an electrode.

8. The method of claim 1 wherein the magnesium-lithium alloy has a magnesium content greater than 70 wt. %.

9. The method of claim 1 wherein the magnesium-lithium alloy has a magnesium content greater than 75 wt. %.

10. The method of claim 1 wherein pre-lithiating the electrode by transferring lithium ions from the magnesium-lithium alloy to the electrode comprises de-alloying the magnesium-lithium alloy to form a porous magnesium-rich microstructure having a lithium content of less than 0.1 wt. % lithium.

11. A method for making a battery with a pre-lithiated anode, the method comprising:
    producing a magnesium-lithium alloy as a β-phase;
    forming a sheet from the magnesium-lithium alloy;
    arranging the sheet, a cathode, cathode/anode separator, and non-lithiated anode adjacent one another;
    electrochemically connecting the magnesium-lithium alloy to the anode;
    pre-lithiating the anode by transferring lithium ions from the magnesium-lithium alloy to the anode, thereby forming the pre-lithiated anode from the anode and a porous magnesium-rich microstructure having a lithium content of less than 1 wt. % lithium from the magnesium-lithium alloy;
    electrochemically disconnecting the pre-lithiated anode from the porous magnesium-rich microstructure; and
    electrochemically connecting the pre-lithiated anode to the cathode for operation of the battery.

12. The method of claim 11 wherein the magnesium-lithium alloy has a lithium content of at least 10.2 wt. % and a magnesium content greater than 55 wt. %.

13. The method of claim 11 wherein electrochemically connecting the magnesium-lithium alloy to the anode comprises locating the magnesium-lithium alloy adjacent to the anode, and wherein the method further comprises positioning a pre-lithiation separator between the anode and the magnesium-lithium alloy.

14. The method of claim 11 wherein electrochemically connecting the magnesium-lithium alloy to the anode comprises locating the magnesium-lithium alloy adjacent to the anode, and wherein the method further comprises keeping the porous magnesium-rich microstructure adjacent to the anode during operation of the battery.

15. The method of claim 11 wherein electrochemically connecting the magnesium-lithium alloy to the anode comprises locating the magnesium-lithium alloy adjacent to the anode, and wherein the method further comprises removing the porous magnesium-rich microstructure from the battery before operation of the battery.

* * * * *